United States Patent [19]

Pearce et al.

[11] Patent Number: 4,468,158

[45] Date of Patent: Aug. 28, 1984

[54] INPLACE BALL VALVE REPAIR APPARATUS

[75] Inventors: David R. Pearce, Bremerton; Archie S. Lien, Poulsbo, both of Wash.

[73] Assignee: The United States of America as represented by the Secretary of The Navy, Washington, D.C.

[21] Appl. No.: 445,116

[22] Filed: Nov. 29, 1982

[51] Int. Cl.$^3$ .............................................. B23B 41/00
[52] U.S. Cl. ................................ 408/16; 51/241 VS; 408/83.5; 82/1.2; 82/1 A
[58] Field of Search ................... 408/3, 16, 62, 72, 75, 408/77, 79, 83.5, 101, 102, 116, 146, 238; 82/1 A, 1.2, 1.4, 4 C; 51/241 VS, 241 A; 33/174 Q, 180 R, 181 R

[56] References Cited

U.S. PATENT DOCUMENTS

| 1,091,918 | 3/1914 | Eynon | 137/242 |
| 1,099,215 | 6/1914 | Sullivan | 10/121 |
| 2,720,736 | 10/1955 | McAfee | 51/241 |
| 2,977,727 | 4/1961 | Gray et al. | 51/241 |
| 4,114,483 | 9/1978 | Grimsley | 82/1.2 |
| 4,147,462 | 4/1979 | Appleby et al. | 408/80 |
| 4,175,471 | 11/1979 | Wilger et al. | 408/83.5 |
| 4,205,495 | 6/1980 | Grimsley | 51/241 VS |

Primary Examiner—Z. R. Bilinsky
Assistant Examiner—Daniel W. Howell
Attorney, Agent, or Firm—R. F. Beers; C. D. B. Curry; W. C. Daubenspeck

[57] ABSTRACT

Apparatus for inplace refinishing of the annular seating surfaces in top loaded ball valves which comprises a locating ring adapted to be mounted on the top surface of the valve housing. An alignment gage is provided for precisely positioning the locating ring. A cutting apparatus is mounted on the precisely positioned locating ring. The cutting apparatus includes a carriage plate for mounting on the locating ring, channel-forming means mounted on the carriage plate and a cutting tool having a housing adapted to side in the channels and having a cutting head oriented to cut the seating surface at the desired angle.

4 Claims, 7 Drawing Figures

U.S. Patent  Aug. 28, 1984  Sheet 1 of 3  4,468,158
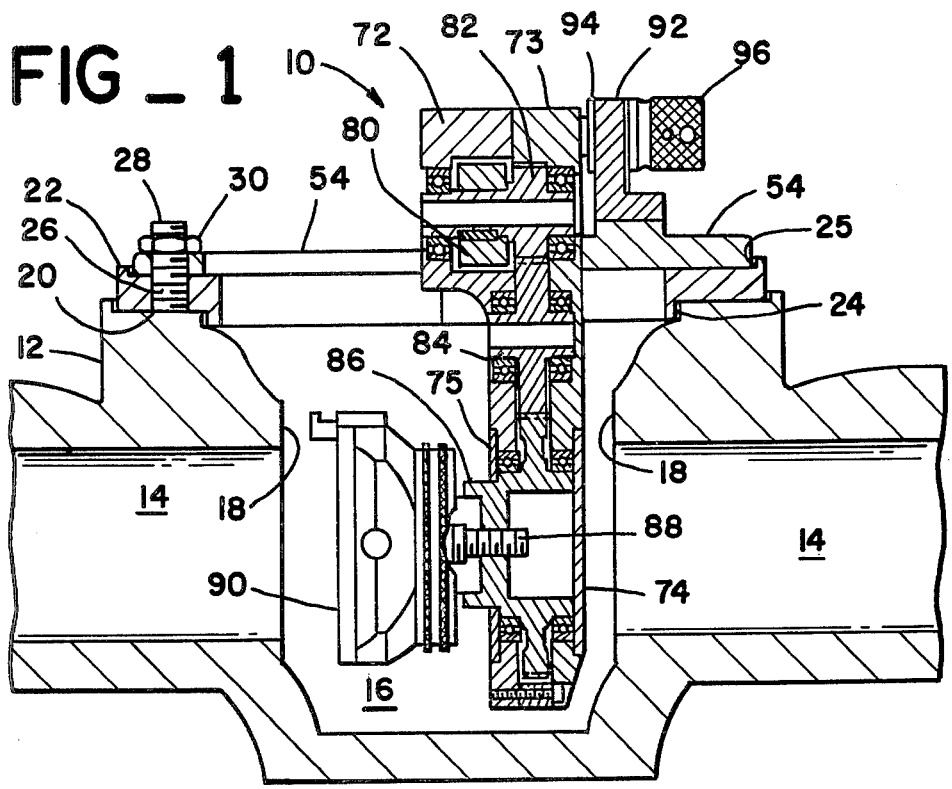
FIG _ 1
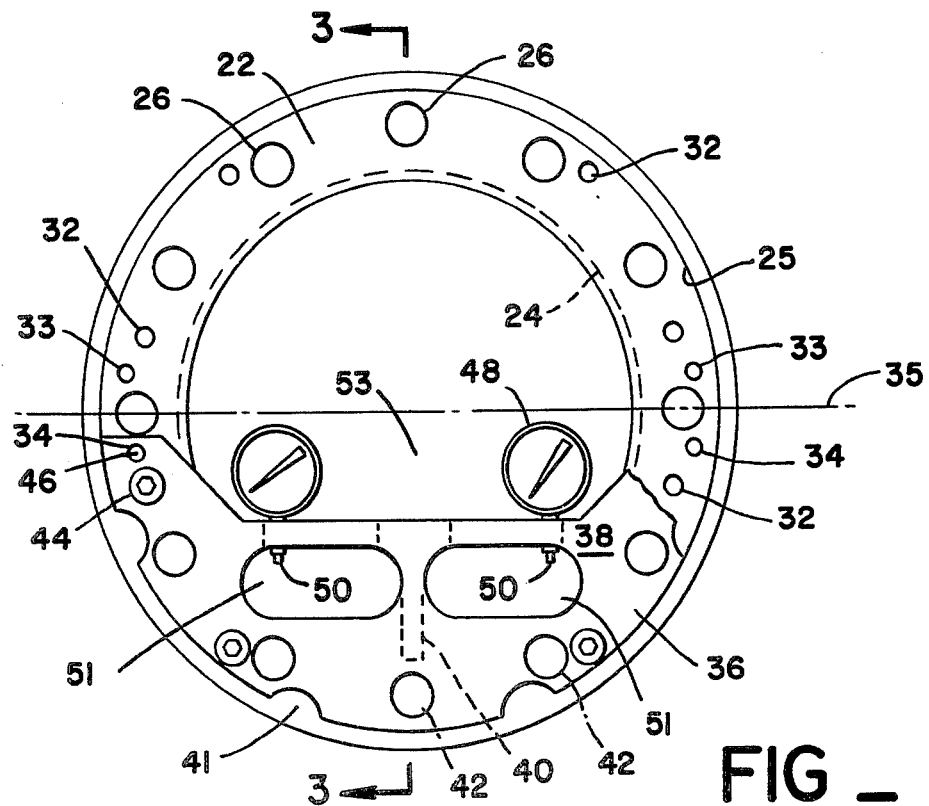
FIG _ 2

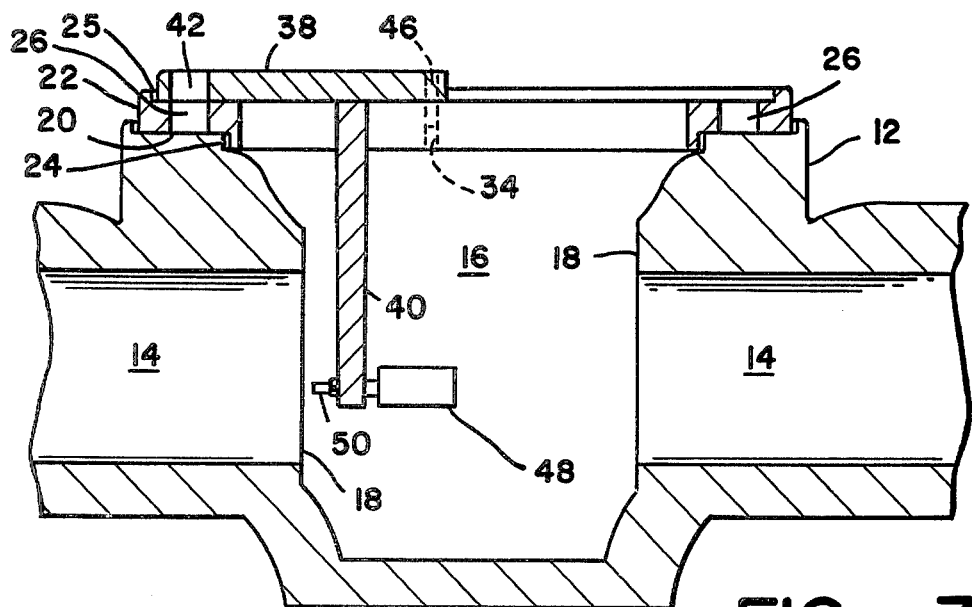
FIG_3
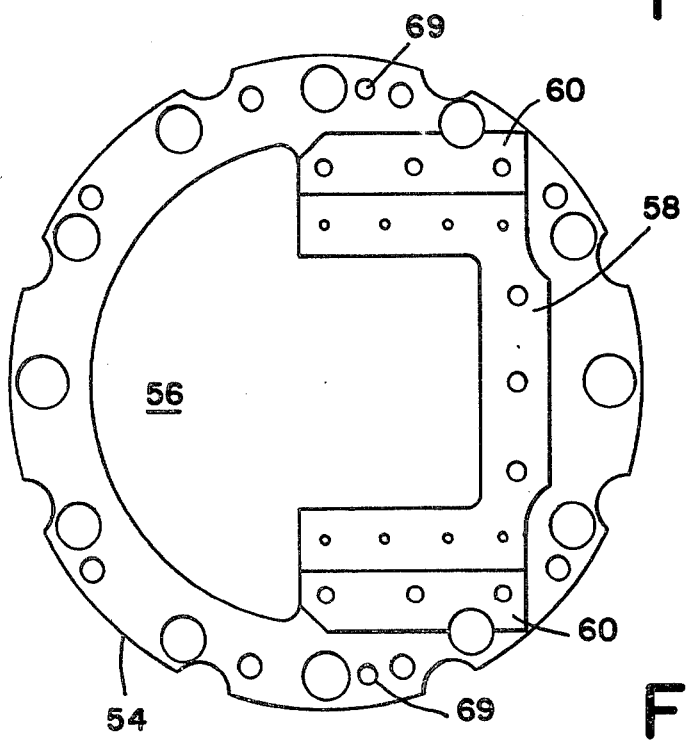
FIG_4
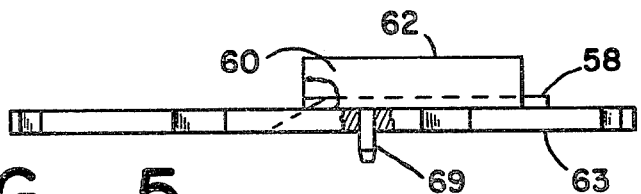
FIG_5

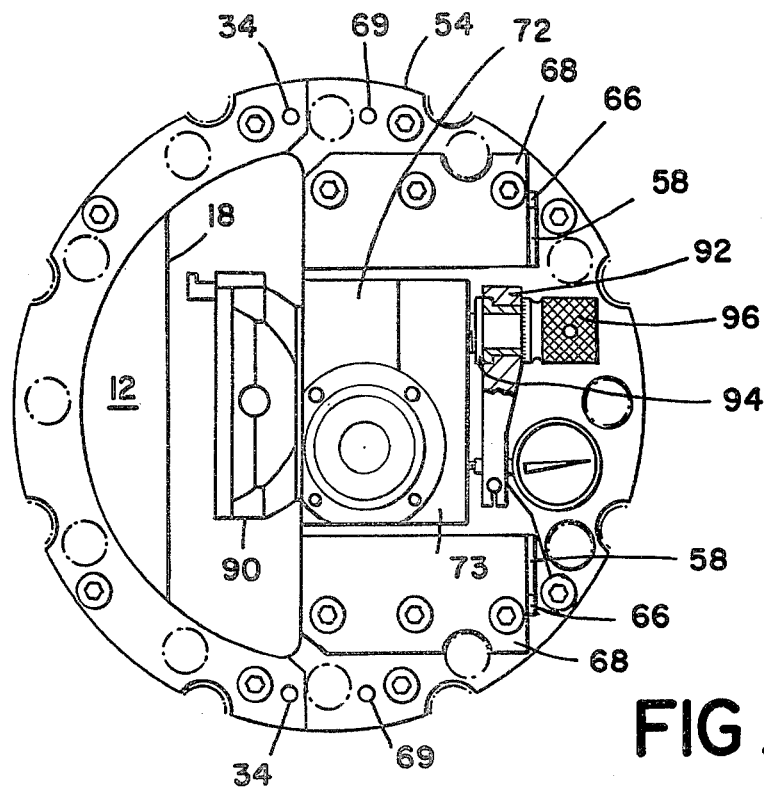
FIG_6
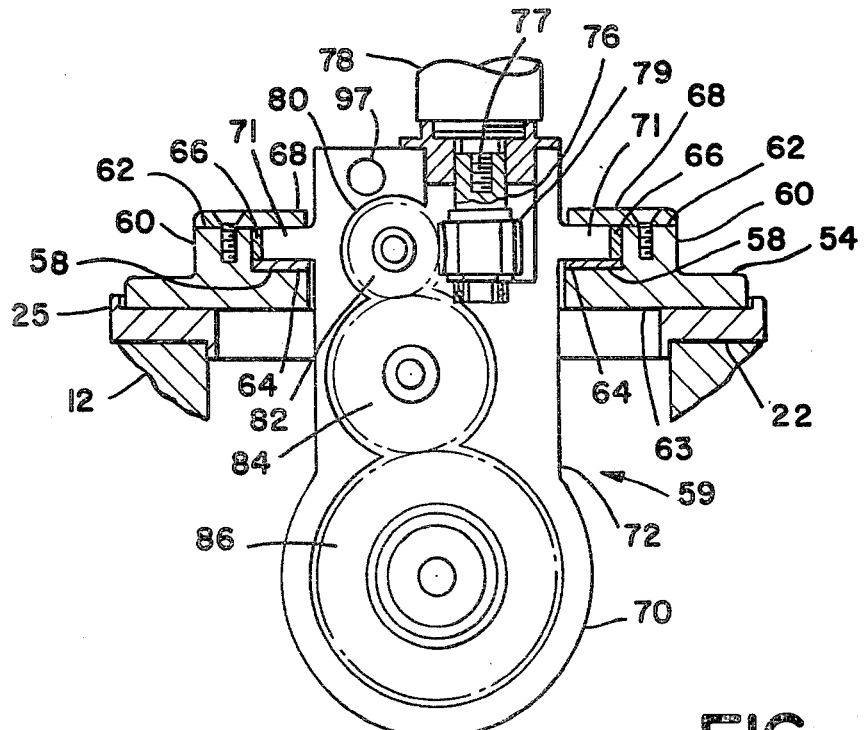
FIG_7

4,468,158

INPLACE BALL VALVE REPAIR APPARATUS

BACKGROUND OF THE INVENTION

1. Field of the Invention

This invention relates to the repair of ball valves and, in particular, to an apparatus for inplace refinishing of the seating surfaces in top loaded ball valves.

2. Description of Prior Art

The seating surfaces of ball valves, particularly those used in controlling the flow of water or other materials under high pressure, are subject to damage due to the corrosive action of the material flowing through the valve or the cutting action of the high pressure flow. In the past, the leaking valves were cut from the system, taken to a remote location for repair, and then reinstalled. This procedure involves much time and expense, in part because the valves are often in relatively inaccessible locations and safety factors require a thorough examination of the installation joints (welded) and system testing.

U.S. Pat. No. 4,114,483 entitled "Portable Boring Tool for Ball Valves" discloses apparatus capable of refinishing the seating surface of ball valves in line. However, the apparatus described therein has some limitations. Each embodiment of the apparatus is suitable for use with only a single valve; a separate apparatus is required for valves of different sizes. The alignment of the apparatus on the valve is also subject to error. The apparatus is positioned independently for each face of the valve. Thus there is no assurance that each face is the same distance off center or even if the resurfaced faces are parallel. Proper position is assumed when each of a pair of locating buttons touches the valve face to be resurfaced. This method of alignment is somewhat uncertain, especially since the buttons are not visible during the installation of the apparatus. The uncertainty is increased when the buttons rest in a corroded area of the valve face.

SUMMARY OF THE INVENTION

It is therefore an object of the present invention to provide apparatus for inplace refinishing of the seating surfaces in top loaded ball valves.

Another object of the present invention is to provide such inplace reseating apparatus which is adaptable for several sizes of valves.

A further object of the present invention is to provide such inplace reseating apparatus having the capability of machining a valve to original plan tolerances.

Another object of the present invention is to provide inplace reseating apparatus in which the cutting tool may be accurately mounted on the valve to produce precisely oriented seating surfaces.

Still another object of the present invention is to provide inplace reseating apparatus in which only a single alignment is necessary.

A further object of the present invention is to provide inplace reseating apparatus providing accurate movement of the cutting tool.

Another object of the present invention is to provide an inplace reseating apparatus with which the seating surface is inherently resurfaced at the proper seating angle.

These objects are provided by a valve cutting apparatus in which a locating ring designed for a specific top loaded ball valve is mounted on the valve top surface. The locating ring is precisely positioned on the valve with its centerline midway between the desired location of the seating surfaces and parallel to the desired orientation of the seating surfaces through use of an alignment gage. The gage, which may be used with top loaded ball valves of different sizes, has a first plate which is precisely mounted on the top surface of the locating ring and a second plate which extends downward into the central chamber of the valve. The gage includes measuring gages oriented to measure the location of seating surfaces with respect to the centerline of the valve. When the locating ring is in the desired location, the alignment gage is removed from and a cutting apparatus is mounted on the locating ring. The cutting apparatus includes a carriage plate that is precisely mounted on the locating ring and a cutting tool that is slidably mounted on the carriage plate.

Other advantages and novel features of the invention will become apparent from the following detailed description of the invention when considered in conjunction with the accompanying drawings wherein:

BRIEF DESCRIPTION OF THE DRAWINGS

FIG. 1 is a cross-sectional view of the valve cutting apparatus mounted on a top loaded ball valve;

FIG. 2 is a top plan view of alignment apparatus for positioning the valve cutting apparatus;

FIG. 3 is a cross-sectional view of the alignment apparatus mounted on a top loaded ball valve taken along line 3—3 in FIG. 2;

FIG. 4 is a top plan view of the carriage plate of the valve cutting apparatus;

FIG. 5 is a side view of the carriage plate of the valve cutting apparatus;

FIG. 6 is a top plan view of the valve cutting apparatus mounted on a top loaded ball valve; and FIG. 7 is a partially cross-sectional front view of the valve cutting apparatus mounted on a top loaded ball valve.

DESCRIPTION OF THE PREFERRED EMBODIMENT

Referring now to the drawing wherein like reference characters represent like parts throughout the several views and, in particular to FIG. 1, there is shown a valve cutting apparatus 10 mounted on the housing 12 of a conventional top loaded ball valve. The housing 12 has inlet and outlet passages 14 communicating with a central chamber 16. When the valve is assembled for normal operation, a ball or a movable valving element is disposed in the chamber and is coupled to a stem which extends upwardly through a top cover to a handle or wheel. Two sealing rings are seated against the annular inward-facing surfaces 18 of the chamber 16 and form a seal between the ball element and the annular surfaces 18. The top cover, the valving element and its operating mechanism, and the seals are all removed prior to mounting the cutting apparatus 10 in the valve housing 12.

The annular sealing surfaces 18 are oriented so that (1) they are inclined inwardly and downwardly at an angle of approximately one degree with respect to a plane normal to the top surface 20 of the housing 12 and (2) horizontal lines in the planes defined by the surfaces 18 are parallel. The deterioration of the surfaces 18 during normal use makes it necessary to periodically refinish the surfaces so that an effective seal may be made with the sealing rings. Typically the resurfacing involves restoring each annular surface 18 to its designed orientation and then cementing a shim on the resurfaced seat to bring the surface 18 to the position required for proper seating of the seal and valving element.

The facing machine includes a locating ring 22 having an outward facing annular shoulder 24 on the bottom surface which fits closely within the circular top opening of the valve housing 12 when the locating ring is disposed on the top surface 20 of the valve housing 12. An inward facing annular shoulder 25 is formed on the top surface for retaining parts to be mounted on the locating ring 22. The locating ring 22, as best shown in FIG. 2, is provided with a plurality of holes 26 which extend through the ring. These holes 26 are aligned with threaded holes in the valve housing 12 which hold upwardly extending threaded studs 28 for fastening the valve cover (not shown). The number and location of holes 25 is determined by the specific valve structure. As shown in FIG. 2, twelve holes are provided in the illustrated embodiment. The holes 26 are of a larger diameter than the threaded studs 28 to allow the locating ring to be precisely positioned on the housing as will be described hereinafter. Nuts 30 placed on the studs 28 may be tightened to secure the locating ring 22 in place once the proper position is determined. A plurality of internally threaded apertures 32 are provided in the locating ring 22 to aid in lifting the ring from the valve housing 12.

The locating ring 22 has two pairs of precisely located apertures 33 and 34 with one pair of apertures on each side of the centerline 35. These apertures 33 or 34 provide locating holes for an alignment gage 36 which is used to precisely position the locating ring 22 on the top surface 20 of the valve housing 12. The alignment gage 36, which is shown in FIGS. 2 and 3, includes a semi-circular plate 38 which lies flat on the top surface 20 of the locating ring 22 and a second plate 40 which is normal to the semi-circular plate and which extends downward into the central chamber 16 when the gage is positioned on the locating ring. To allow the gage 36 to be used to align locating rings 22 on several sizes of valves, the semi-circular plate 38 has several sets of apertures (two sets 41 and 42 in the illustrated embodiment) which correspond to the location of the studs 28 of the valve housing 12 and receive the studs 28 when the gage is mounted on the locating ring 22. A set of internally threaded apertures 44 is provided for lifting the gage 36 from the locating ring 22.

The semi-circular plate 38 has a pair of downwardly extending dowel pins 46 which slip fit into one pair of the precisely located apertures 33 or 34 of the locating ring 22 so that the gage 36 may be precisely fixed relative to the locating ring on either side of the centerline 35.

A pair of micrometer gages 48 are secured to the downward extending plate 40. The micrometer gages 48 extend through the downwardly extending plate 40 and normal to it with the measuring tips 50 directed toward one face 18 of the chamber 16 on either side of the inlet passage 14 and with the indicator extending into the central area of chamber 16. The semi-circular plate 38 is provided with viewing apertures 51 and cut-away opening 53 for observing the positions of the measuring tips 50 and the readings of the indicators, respectively, through the top opening of the housing.

The locating ring 22 is positioned in the following manner: The locating ring 22 is mounted on the top surface 20 of the housing 12 with the threaded studs 28 (not shown in FIG. 3) extending through the holes 26 in the ring. The alignment gage 36 is then mounted on the ring 22 with the dowel pins 46 mating with one pair of apertures 33 or 34 to precisely position the gage on ring. The micrometers 48 may then be used to determine the position of the locating ring 22. The alignment gage 36 may be removed from the ring 22 and rotated 180° to be remounted on the ring with the dowel pins 46 mated with the second pair of apertures 33 or 34 to show if the centerline 35 of the locating ring 22 is positioned directly on the centerline of the valve and parallel to the faces 18. Because the gage 36 fits on dowel pins 46 and the micrometers 48 can be set with a single gage block, the exact distance each face 18 is off of the centerline 35 and the angular orientation of each seat can be determined. When the locating ring 22 is properly positioned so that its centerline 35 is directly on the centerline of the valve and parallel to the faces 18, the alignment gage 36 is removed and the ring is secured in place on the threaded studs 28 by nuts 30. The micrometer readings indicate to the operator whether the valve was originally machined to the design dimensions. The micrometer readings should be recorded for later reference.

The cutting apparatus 10 is then installed on the locating ring 22. Referring to FIGS. 1 and 4–7, the cutting apparatus 10 includes a generally circular carriage plate 54 having an outside circumference dimensioned to fit into the inner facing annular surface 25 of the locating ring 22. The carriage plate 54 has a semi-circular opening 56 on a first side for viewing into the central chamber 16 and a U-shaped surface 58 for supporting a cutting tool on the other side, with the cutting tool extending downward into the chamber 16. The carriage plate 54 has a pair of islands 60 which define the supporting surface 58. The U-shaped supporting surface 58 and the top surfaces 62 of the islands 60 are inclined at an angle of one degree with the bottom surface 63 of the carriage plate. A pair of slide plates 64 are removably fixed to the supporting surface 58 and a pair of side plates 66 are removably fixed to the internally facing surface of each island 60. A keeper plate 68 is fixed to the top surface of each island 60 and extends inwardly to the inner edge of the supporting surface 58. A pair of rectangular channels sloping at one degree and opening inwardly are formed between slide plates 64, the side plate 66, and the keeper plates 68. A pair of dowel pins 69 are disposed in the carriage plate 54 and are positioned to mate with the alignment apertures 33 or 34 of the locating ring 22. The dowel pins 69 position the carriage so that the cutting apparatus may be precisely mounted on the locating ring.

The housing 70 of the cutting tool has arms 71 which extend into the channels so that the cutting tool, supported by the arms 71, extends downward into the central chamber 16. The slide plates 64 and the side plates 66 provide easily replaceable surfaces on which the arms 71 of the housing may slide so that the cutting tool may be positioned in the chamber 16. The housing 70 includes a front cover 72, a back cover 73, a circular cover plate 74, and annular plate 75. The arms 71 are formed by the front cover 72 and the back cover 73.

The cutting tool includes a shaft adapter 76 which is coupled between the drive shaft 77 of an air motor 78 and a first helical gear 79. The helical gear 79 meshes with gear 80. The helical gear 80 is coupled to gear 82 which meshes with gear 84 which meshes with gear 86.

The various gears are mounted on suitable bearings (unnumbered) which are supported by the housing 70. The last gear 86 in the drive line is coupled to a differential shaft 88 upon which is mounted a boring head 90 such as a Wohlhoupter Model No. UPA-3.

An L-shaped feed pad 92 is mounted on the carriage plate 54 behind the cutting tool. A threaded feed shaft 94 having a knurled knob 96 attached passes through an aperture in the feed pad to mate with a threaded aperture 97 in the housing 70. Rotation of the feed shaft 94 adjusts the position of the housing (and thus the position of the cutting head) relative to the fixed carriage which allows the position of the boring head to be adjusted relative to the valve face. A micrometer 98 is fixed to the feed pad 92 and has its measuring tip against the back cover 73 of the housing 70 for indicating the position of the cutting tool.

After the locating ring 22 is properly mounted and secured in place on the top surface 20 of the housing 12, the cutting apparatus 10 is mounted on the locating ring. The dowel pins 69 of the carriage plate 54 mate with one set of alignment aperture 33 or 34 to align the cutting apparatus 10 with a first valve seat 18. The operator now advances the cutting tool by rotating the feed knob 96 until the boring head 90 contacts the valve seat 18. The rotation of the feed knob 96 causes the housing 70 to slide forward or backward on arms 71 in the sloping rectangular channels formed between the slide plates 65, the side plates 66, and the keeper plates 68. With the boring head 90 in contact with the valve seat 18, the cutter micrometer 98 is set to zero. The drive motor 78 is now engaged and the cutting tool is advanced to the desired depth as indicated by the cutter micrometer 98. The cutting tool may then be retracted in the rectangular channel and the cutting apparatus 10 removed from the locating ring 22. The depth of the cut may be checked by mounting the alignment gage 36 on the locating ring 22 and then comparing the reading to that taken and recorded during setup.

The cutting apparatus 10 is now rotated 180° degrees and mounted on the locating ring with the boring head 90 facing the second valve seat 18. The second valve seat may then be cut to the desired depth and parallel to the first seat by advancing the cutting tool as indicated by the cutter micrometer 98. As long as the locating ring 22 is in its original set up, the alignment gage 36 and the cutting apparatus 10 can be mounted or removed as desired without any additional alignment.

Obviously many modifications and variations of the present invention are possible in the light of the above teachings. It is therefore to be understood that within the scope of the appended claims the invention may be practiced otherwise than as specifically described.

What is claimed is:

1. Apparatus for inplace refinishing of the annular seating surfaces in top loaded ball valves, said seating surfaces having a desired orientation such that the seating surfaces are inclined inwardly and downwardly at a specified very small angle with respect to a plane normal to the horizontal top surface of the valve's housing and lines in the planes defined by the seating surfaces and parallel to the top surface are parallel, which comprises:

(a) a locating ring having a bottom surface adapted for resting on the top surface of the valve housing, the top surface of said locating ring providing a flat surface oriented similarly relative to the desired orientation of each seating surface of said valve, the centerline of said locating ring being oriented parallel to the desired orientation of the seating surfaces and over the centerline of said valve when said locating ring is aligned on said valve housing, said locating ring having a first pair of apertures positioned on a first side of the centerline and symmetrically disposed relative to said centerline, said locating ring having a second pair of apertures positioned on the second side of the centerline and symmetrically disposed relative to said centerline in the same way that said first pair of apertures are symmetrically disposed;

(b) an alignment gage for positioning said locating ring on the top surface of said valve, said alignment gage including a first plate which is disposed on the top surface of the locating ring, said first plate including a pair of dowel pins disposed to mate with either of said first pair of apertures or said second pair of apertures of said locating ring so that the position of said first plate is precisely fixed on said locating ring, said alignment gage having a second plate which is attached to the first plate and extends downward into the central chamber of the valve when the gage is positioned on the locating ring, said second plate having a pair of measuring gages secured thereto, each gage having a measuring tip and an indicator, said measuring gages being oriented so that the measuring tip of each gage is perpendicular to the centerline of said locating ring when said alignment gage is positioned on the locating ring, the measuring tips of said measuring gages being separated so that the tips are aligned with the sealing surface on opposite sides of the inlet passage of the valve when facing the sealing surfaces, said first plate having openings for viewing the measuring tips and indicators of said measuring gage when said alignment gage is disposed on said locating ring;

(c) a carriage plate having a bottom surface adapted to rest on the top surface of said locating ring, said carriage plate having a pair of dowel pins disposed to mate with either said first pair of apertures in said locating ring or said second pair of apertures in said locating ring, said carriage plate being disposed on said locating ring after said carriage plate being positioned on said valve through use of the alignment gage, said carriage plate having channel-forming means, the channels formed by said channel-forming means being parallel and inclined at said very small angle with respect to the bottom surface of said carriage plate;

(d) a cutting tool having a housing adapted to be supported by said channels and slide in said channels, said cutting tool including a boring head disposed to face the sealing surface of said valve and having its cutting plane oriented normal to the channel formed by said channel-forming means, said cutting tool having means for driving said boring head; and (e) means for sliding said cutting tool in said channels to position said boring head relative to the valve face, said means for sliding including measuring means for indicating the position of the cutting tool;

(f) whereby, after said locating ring is accurately positioned with the air of said alignment gage, said alignment gage is removed from said locating ring and said carriage plate with said cutting tool thereon is inserted into said apertures in said locating ring.

2. Apparatus as recited in claim 1 wherein said carriage plate has an opening on a first side for viewing into the central chamber, and wherein said channel-forming means includes:
 (a) a U-shaped surface on the top surface of said carriage plate for supporting said cutting tool, said U-shaped surface being inclined at said very small angle toward the seating surface to be refinished;
 (b) a pair of islands disposed on the outside edges of the U-shaped supporting surface to provide outside walls for said channels, the top surface of said islands being inclined at said very small angle toward the seating surface to be refinished; and
 (c) a pair of keeper plates fixed to the top surface of said islands and extending inwardly to the inner edge of said U-shaped supporting surface, said U-shaped supporting surface, said islands, and said keeper plates forming said inclined channels opening inwardly and extending toward the surface to be refinished.

3. Apparatus as recited in claim 2 wherein said cutting tool includes:
 (a) means for coupling rotary motion of the drive shaft of a driving means to said boring head.

4. Apparatus as recited in claim 3 wherein said means for sliding includes:
 (a) a feed screw means coupled between said carriage plate and the housing of said cutting tool for linear movement of said cutting tool in said channels toward and away from said sealing surface to be refinished.

* * * * *